United States Patent
Reeb et al.

(10) Patent No.: US 8,668,204 B2
(45) Date of Patent: Mar. 11, 2014

(54) SPRING-ELASTIC AXIAL SEAL

(75) Inventors: Georg Reeb, Buehl Eisental (DE); Claudius Muschelknautz, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 48 days.

(21) Appl. No.: 13/391,321

(22) PCT Filed: Jul. 5, 2010

(86) PCT No.: PCT/EP2010/059551
§ 371 (c)(1),
(2), (4) Date: Feb. 20, 2012

(87) PCT Pub. No.: WO2011/020643
PCT Pub. Date: Feb. 24, 2011

(65) Prior Publication Data
US 2012/0146293 A1   Jun. 14, 2012

(30) Foreign Application Priority Data
Aug. 19, 2009   (DE) .................. 10 2009 028 652

(51) Int. Cl.
*F16J 15/22*   (2006.01)
(52) U.S. Cl.
USPC ........................................ 277/551
(58) Field of Classification Search
CPC . F16J 15/3288; F16J 15/3264; F16J 15/3236; F16J 15/0887
USPC ......... 277/551, 553, 555, 567, 589, 345, 353, 277/438, 647
See application file for complete search history.

(56) References Cited

U.S. PATENT DOCUMENTS

| | | | |
|---|---|---|---|
| 2,761,709 A * | 9/1956 | Gilbert, Sr. | 277/513 |
| 2,927,830 A * | 3/1960 | Workman | 92/194 |
| 3,233,862 A * | 2/1966 | Marsh | 251/172 |
| 3,698,727 A * | 10/1972 | Greenwald | 277/618 |
| 4,179,130 A * | 12/1979 | Fass et al. | 277/384 |
| 4,441,726 A * | 4/1984 | Uhl | 277/652 |
| 4,492,252 A * | 1/1985 | Kanai | 137/625.43 |
| 4,592,558 A * | 6/1986 | Hopkins | 277/572 |
| 6,290,240 B1 | 9/2001 | Knapp | |
| 6,719,271 B2 * | 4/2004 | Faramarzi | 251/282 |

(Continued)

FOREIGN PATENT DOCUMENTS

| | | |
|---|---|---|
| CN | 1989344 | 6/2007 |
| DE | 3206412 | 9/1983 |

OTHER PUBLICATIONS

PCT/EP2010/059551 International Search Report dated Oct. 1, 2010 (Translation and Original, 4 pages).

*Primary Examiner* — Vishal Patel
*Assistant Examiner* — Nathan Cumar
(74) *Attorney, Agent, or Firm* — Michael Best & Friedrich LLP (57) ABSTRACT

The invention relates to a seal (160) for sealing two opposite contact surfaces along a closed contour, comprising an elastic sealing element (210), which has two opposite sealing surfaces (240) to bear against the contact surfaces in the region of the contour, two spring elements (220, 230), each of which is associated with one of the sealing surfaces, and a supporting element (250) arranged between the spring elements, wherein each spring element comprises two limbs (260, 270), one limb pressing the sealing surface associated with the spring element against one of the contact surfaces and the other limb being supported on the supporting element.

13 Claims, 5 Drawing Sheets

(56) References Cited

U.S. PATENT DOCUMENTS

| | | | |
|---|---|---|---|
| 7,686,308 B2 * | 3/2010 | Van Schoor | 277/551 |
| 7,959,159 B2 * | 6/2011 | Hocker et al. | 277/559 |
| 8,393,400 B2 * | 3/2013 | Buckle | 166/368 |

* cited by examiner

SPRING-ELASTIC AXIAL SEAL

BACKGROUND OF THE INVENTION

The invention relates to a seal. In particular, the invention relates to a seal for sealing off two bearing faces lying opposite one another.

Sealing off bearing faces which lie opposite one another is necessary, for example, where slide valves are concerned. The planar surfaces of a valve body and of a sealing disk are mounted there parallel to one another with a clearance. An orifice in the valve body enables a fluid medium, for example a cooling liquid, to flow to the valve disk. The valve disk is arranged displaceably with respect to the valve body, for example linearly or rotatably, and has an orifice which is more or less in alignment with the orifice in the valve body, depending on the position of the valve disk. The orifices may, for example, have a round or elliptic cross section. Accordingly, a flow of a fluid medium through the valve disk is dependent upon its displacement position with respect to the valve body.

In order to prevent medium from flowing through the gap between the valve disk and the valve body, it is necessary to provide a seal in this region. Such a seal usually lies in the gap and is fastened non-displaceably on one side either to the valve disk or to the valve body.

The seal is arranged in such a way that it bears under a certain pressure against the two surfaces lying opposite one another and thereby ensures leaktightness with respect to the fluid. In some applications, a clearance between the two surfaces may be variable during operation, and under some circumstances the clearance is subject to a certain variance even at the time of installation. Leaktightness of the two surfaces may be dependent upon a clearance of the bearing faces, and the result of this may be that no leaking occurs in the region of the seal in specific operating situations, for example in the case of a fluid contaminated with pollutants or in the case of different thermally induced expansions of parts of the slide valve.

SUMMARY OF THE INVENTION

The object on which the invention is based, therefore, is to specify a reliable seal of two faces lying opposite one another.

A seal for sealing off two bearing faces lying opposite one another, along a closed contour, comprises an elastic sealing element which has two sealing faces lying opposite one another for bearing against the bearing faces in the region of the contour, two spring elements which are assigned in each case to one of the sealing faces, and a supporting element arranged between the spring elements, each spring element comprising two legs, of which in each case one leg presses the sealing face assigned to the spring element onto one of the bearing faces and in each case the other leg is supported on the supporting element.

Two spring elements are thereby connected in series in respect of the spring direction, so that a spring constant of the overall seal is lower than a spring constant of an individual spring element. Thus, operating, installation and manufacturing tolerances in the spring direction can be compensated, without major forces having to be exerted upon the sealing faces, which would result in making it more difficult for the bearing faces to be displaced with respect to the sealing faces.

The supporting element at the same time absorbs part of the shear forces which act in the lateral direction upon the seal during a displacement of a bearing face with respect to a sealing face, so that the seal is not appreciably deformed during displacement and leaktightness can be maintained.

The spring elements can be designed to be integrated with the supporting element in the form of a wavy profile, with the result that the seal can be produced more easily. The wavy profile may have perforations in order to make it easier for the wavy profile to bend along the contour.

Each of the spring elements may comprise a U-shaped or V-shaped profile which runs along the contour. This simple embodiment is known from conventional seals and is tried and tested. Furthermore, in the event of a pressure drop between the inside and the outside of the contour, such a profile can be oriented such that the legs point in the direction of the high-pressure side. The pressure drop presses the legs of the spring element apart, with the result that the sealing action of the seal can be further improved.

The spring elements and the supporting element may be portions of a helical spring. This constitutes a further simple and cost-effective possibility for combining a low spring constant perpendicularly to the sealing faces with a good supporting action against shear forces running laterally with respect to the sealing faces.

The spring elements and the supporting element may alternatively also be portions of an elastic all-metal cushion made from knitted wire cloth, so that the seal also has a high thermal load-bearing capacity.

BRIEF DESCRIPTION OF THE DRAWINGS

The invention is described in more detail below by means of the accompanying drawings in which.

DETAILED DESCRIPTION

Figure 1:
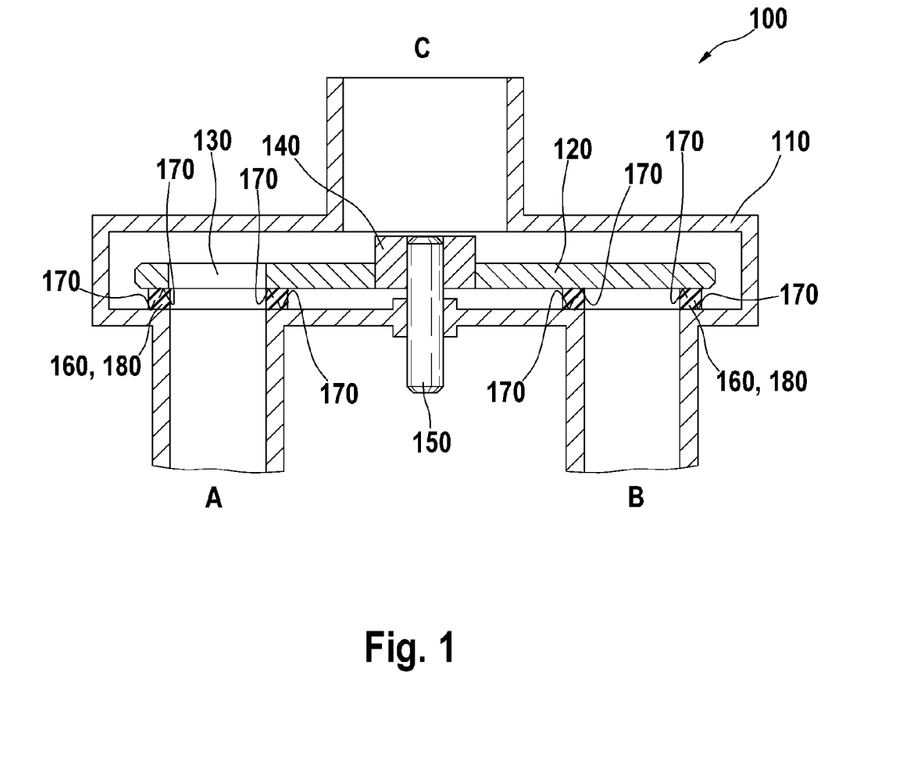
FIG. 1 illustrates a lateral sectional view of a rotary slide valve.

FIG. 1 shows a sectional view of a rotary disk valve 100. The rotary disk valve 100 comprises a valve housing 110, a valve disk 120 with a circular orifice 130 and a hub 140, a disk shaft 150 and two seals 160. Bearing faces 170 for the seals 160 are formed on the valve disk 120 and on the valve body 110. The bearing faces 170 may be composed, for example, of ceramic, hard metal, steel or plastic. A contour 180 runs circularly along the cylindrical connecting face which connects mutually opposite bearing faces 170 to one another. The contour 180 may, for example, be of annular, elliptic, polygonal or irregular form and run parallel between the bearing faces. The valve housing 110 has three inlets/outlets A, B and C. Although a seal 160 according to the invention is not restricted to use in the rotary disk valve 100 or in a valve at all, one possible area of intended use for the seal 160 will be described with reference to the rotary disk valve 100.

The rotary disk valve 100 is designed to allow or prevent a liquid between inlets/outlets A and C or B and C selectively and proportionally. By means of the disk shaft 150, the valve disk 120 is rotated such that the orifice 130 in the valve disk 120 is more or less in alignment with the inlet/outlet A or the inlet/outlet B, as required. In the position illustrated, the orifice 130 in the valve disk 120 is completely in alignment with the inlet/outlet A, so that it is possible for liquid to flow between the inlets/outlets A and C. At the same time, the valve disk 120 prevents liquid from flowing between the inlet/outlet B and one of the inlets/outlets A and C.

The seals 160 in the region of the inlets/outlets A and B have the task of counteracting an overflow of liquid between the inlets/outlets A and B and the valve disk 120. The seals 160 must therefore maintain good upward contact at the bearing faces 170 with respect to the valve disk 120 and downward contact at the bearing faces 170 with respect to the valve housing 110 and at the same time be insensitive to movement of the valve disk 120. In order to compensate operating and manufacturing tolerances in the clearance between the valve disk 120 and the valve housing 110 in the region of the seals 160, the seals 160 have a low spring constant in the vertical direction.

Figure 2:
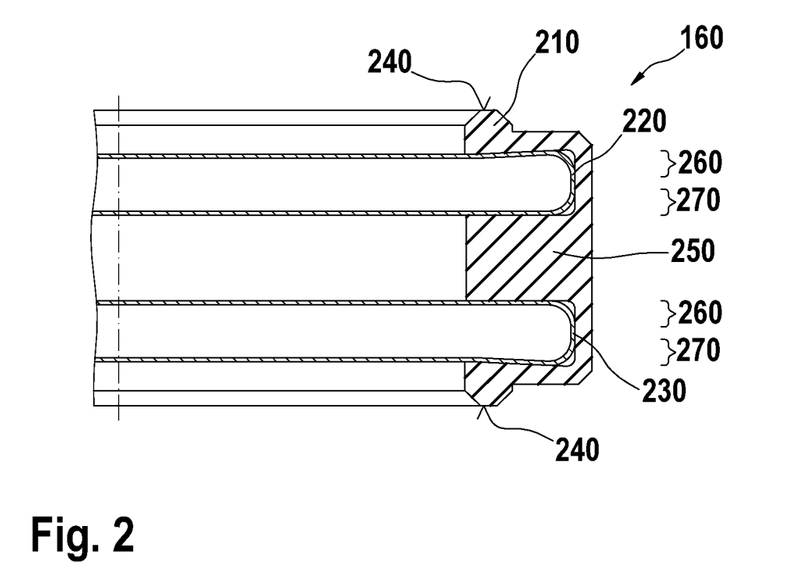
FIG. 2 a sectional view of a first embodiment of a seal for the valve from FIG. 1.

FIG. 2 shows a sectional view of a first embodiment of a seal 160 for the valve 100 from FIG. 1. The seal 160 runs along the circular contour 180 (not depicted) which runs perpendicularly with respect to the drawing plane. For reasons of symmetry, only one sectional plane of the seal 160 is illustrated, and at the left margin of the drawing the bisecting line is depicted which at the same time forms a mid-axis of the contour 180.

The seal 160 comprises a sealing element 210, a first spring element 220 and a second spring element 230. The sealing element 210 has at the top and bottom in each case a sealing face 240 for contact with a bearing face 170 (not depicted). Between the spring elements 220 and 230 the sealing element 210 comprises a web 250. The sealing element 210 has at the top and bottom in each case a sealing lip, the removed boundary faces of which form the sealing faces 240. In the region of the upper sealing lip, the first spring element 230 is arranged in the form of a U-shaped profile open toward the inside of the seal 160 or the contour 180.

Each spring element 220, 230 comprises in each case an upper leg 260 and a lower leg 270. The upper leg 260 of the first spring element 220 presses the sealing face 240 upward. Correspondingly, the second spring element 230 is located in the region of the lower sealing lip, the lower leg 270 of said second spring element pressing the lower sealing face 240 downward. The upper leg 260 of the second spring element 230 and the lower leg 270 of the first spring element 220 are supported against the web 250 from opposite directions. The web 250 is thicker than the portions between the sealing faces 240 and the assigned spring elements 220 and 230, in order to increase the movability of the sealing faces 240 in the vertical direction and at the same time provide a good supporting action between the adjacent legs 260, 270 of the spring elements 220 and 230.

The sealing element 210 surrounds the spring elements 220 and 230 on its outside (on the right). This version is especially advantageous in the event of a pressure drop from the inside of the sealing element 210 to its outside, because the pressure drop can then be utilized to press the sealing faces 240 more strongly onto the respective bearing faces 170.

The sealing element 210 may be manufactured from any permanently elastic material, for example based on silicone, rubber or plastic. The spring elements 220, 230 are manufactured from a spring-elastic stainless sheet steel.

In contrast to a seal 160 with only one spring element, in the case of two spring elements 220, 230 with a corresponding spring constant it is possible to adapt to different clearances between the bearing faces 170 by means of a pressure force which varies by less than a factor 2. If, for example, the clearance is variable by +/−0.1 mm in the case of an individual spring constant of 60 N/mm, when only one spring element 220, 230 is used the pressure force varies by +/−12 N, whereas, when two series-connected spring elements 220, 230 are used, as shown, the pressure force varies by only +/−6 N.

Figure 3:
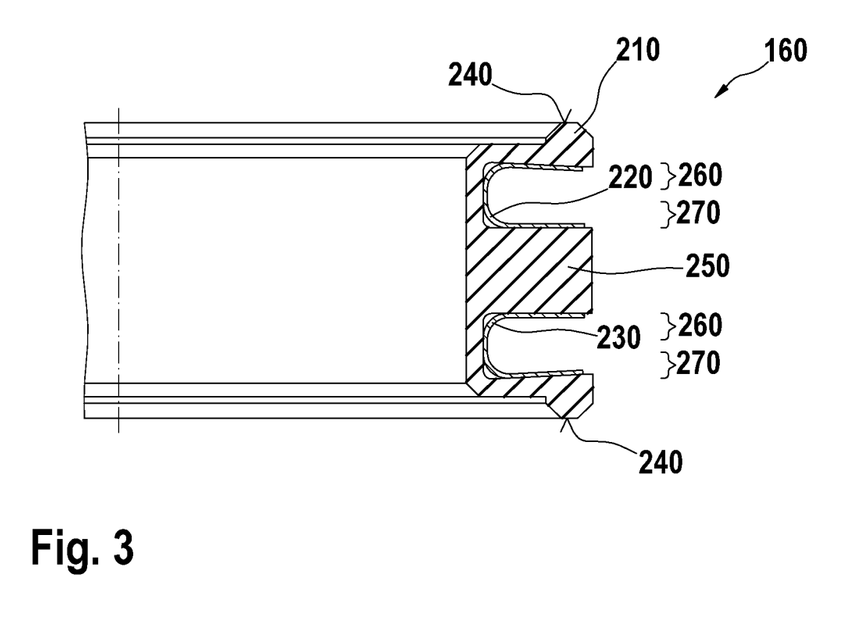
FIG. 3 a sectional view of a second embodiment of a seal for the valve from FIG. 1.

FIG. 3 shows a sectional view of a second embodiment of a seal 160 for the valve 100 from FIG. 1. The embodiment illustrated corresponds to that from FIG. 2, the difference being that the legs 260, 270 of the U-shaped profiles of the spring elements 220 and 230 point outward and are covered inwardly by the sealing element 210. This type of construction is recommended in the case of a pressure drop from the outside inward, in order to increase a pressing action of the sealing faces 240 to the corresponding press-on faces by means of the pressure drop.

Figure 4:
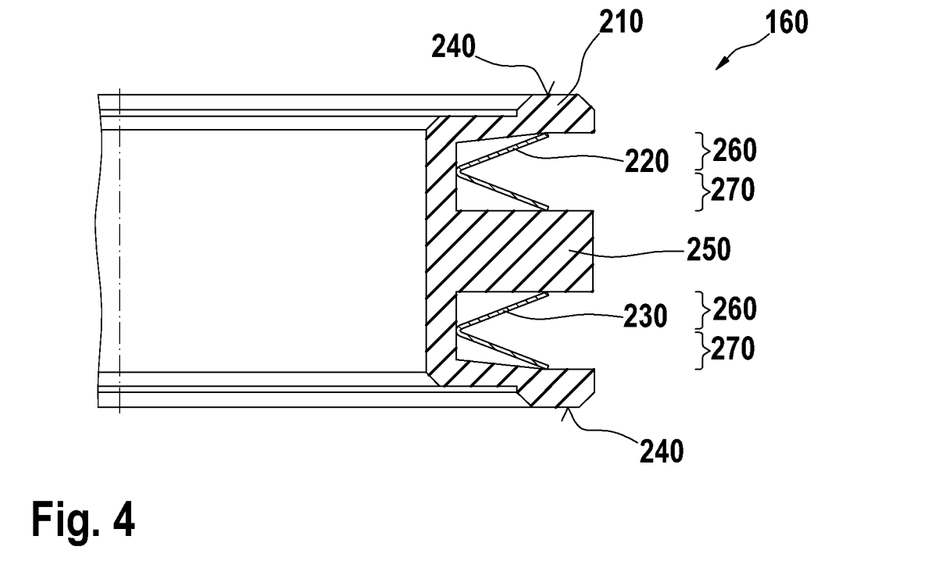
FIG. 4 a sectional view of a third embodiment of a seal for the valve from FIG. 1.

FIG. 4 shows a sectional view of a third embodiment of a seal 160 for the valve 100 from FIG. 1. The seal illustrated is constructed in a similar way to the embodiment illustrated in FIG. 3, but, in contrast to the U-shaped spring elements 220 and 230 in FIG. 3, V-shaped spring elements 220, 230 composed of a V-shaped profile are used. These have a lower spring constant in the vertical direction than the spring elements 220, 230 composed of a U-shaped profile from FIGS. 2 and 3 and thus ensure a lower spring constant of the overall seal 160 in the vertical direction between the sealing faces 240.

Figure 5:
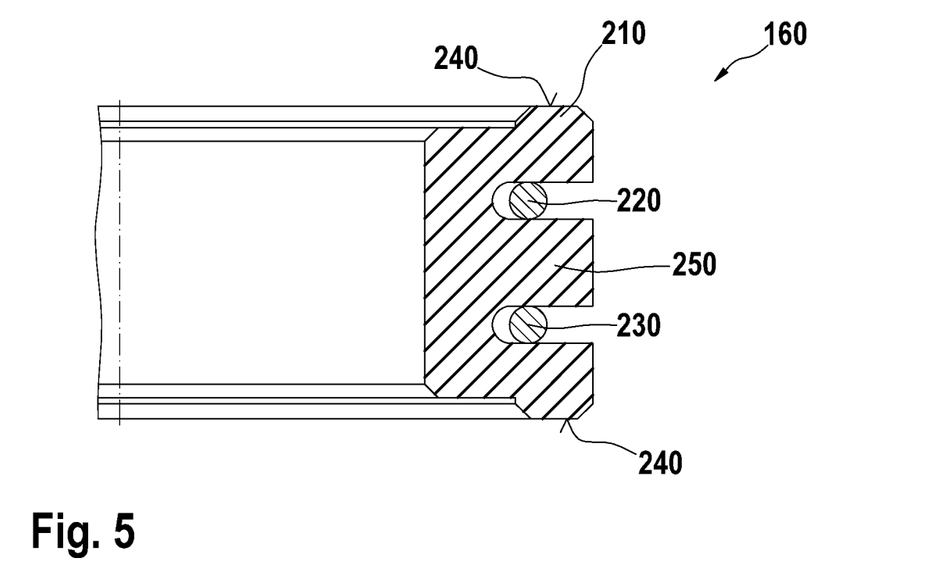
FIG. 5 a sectional view of a fourth embodiment of a seal for the valve from FIG. 1.

FIG. 5 shows a sectional view of a fourth embodiment of a seal 160 for the valve 100 from FIG. 1. The embodiment illustrated corresponds to those of FIGS. 3 and 4, the difference being that spring elements 220, 230 with an O-shaped cross section are used. These may selectively be hollow profiles or profiles composed of solid material; where hollow profiles are concerned, these may be closed or, for example, open along a peripheral seam. A supporting action of the spring elements 220, 230 composed of an O-shaped profile in a vertical direction is greater than, for example, that of the spring elements 220, 230 in the embodiment of FIG. 4. Depending on how far inward or outward the spring elements 220, 230 are arranged on the sealing element 210, they are at a greater or lesser distance from a connecting face between the sealing faces 240 and correspondingly bring about a weaker or stronger spring action in the vertical direction between the sealing faces 240. If the spring elements 220, 230 are far removed from the connecting face, a considerable part of the spring constant of the seal 160 between the sealing faces 240 is brought about by the sealing element 210.

Figure 6:
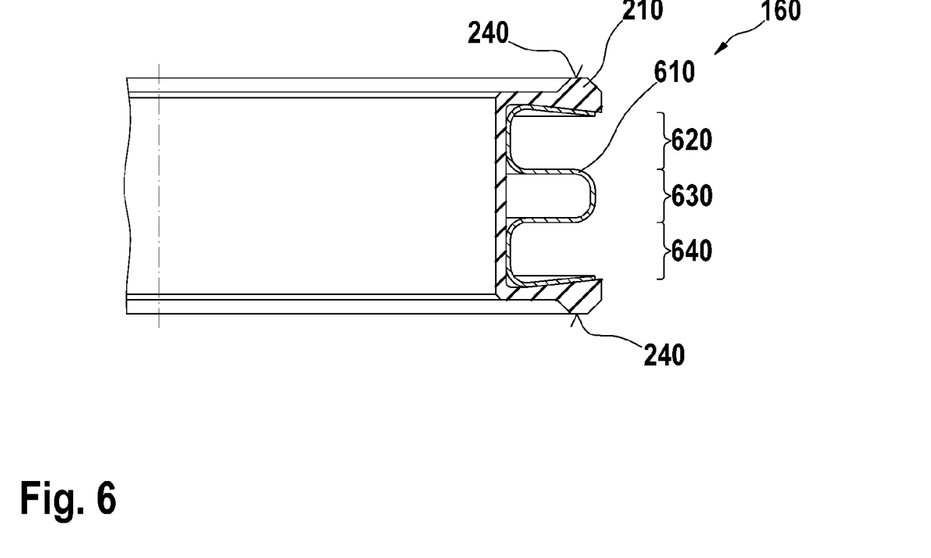
FIG. 6 a sectional view of a fifth embodiment of a seal for the valve from FIG. 1.

FIG. 6 shows a sectional view of a fifth embodiment of a seal 160 for the valve 100 from FIG. 1. The embodiment illustrated corresponds essentially to that from FIG. 3, the difference being that the spring elements 220, 230 shown there and the web 250 are implemented by three portions 620, 630 and 640 of a one-piece spring element 610. The first portion 620 and the third portion 640 correspond to the first spring element 220 and to the second spring element 230 respectively, and the second portion 630 corresponds to the web 250 in the embodiment illustrated in FIG. 3.

Figure 7:
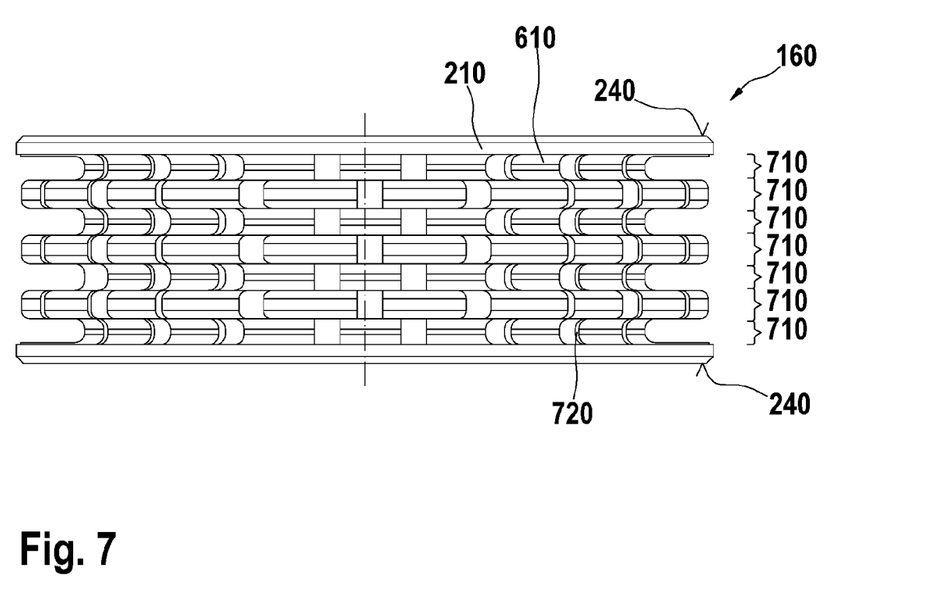
FIG. 7 a side view of a sixth embodiment of a seal for the valve from FIG. 1.

FIG. 7 shows a side view of a sixth embodiment of a seal 160 for the valve 100 from FIG. 1. The embodiment illustrated corresponds to the embodiment illustrated in FIG. 6, the difference being that the spring element 610 has a multiplicity of portions 710 composed of a U-shaped profile in the vertical direction. Moreover, cutouts 720 are made along a circumference of each of the portions 710, in order to make it easier for the spring element 610 to bend along the circumference of the seal 160 during production. Clearances between the perforations may be variable and be low in the region of a narrow radius of the contour and high in the region of a large radius of the contour.

Figure 8:
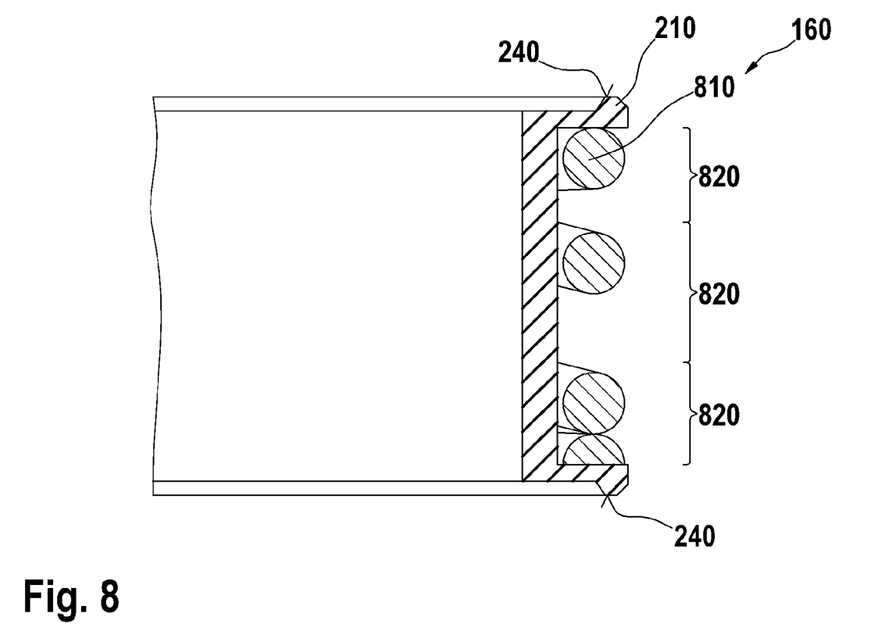
FIG. 8 a sectional view of a seventh embodiment of a seal for the valve from FIG. 1.

FIG. 8 shows a sectional view of a seventh embodiment of a seal 160 for the valve 100 from FIG. 1. This embodiment corresponds to that illustrated in FIG. 6, the difference being that, instead of the spring element 610, a helical spring 810 which comprises a plurality of turns is arranged between the sealing faces 240. The portions 620, 630 and 640 correspond in each case to portions 820 of the helical spring 810 which comprise at least one turn.

Figure 9:
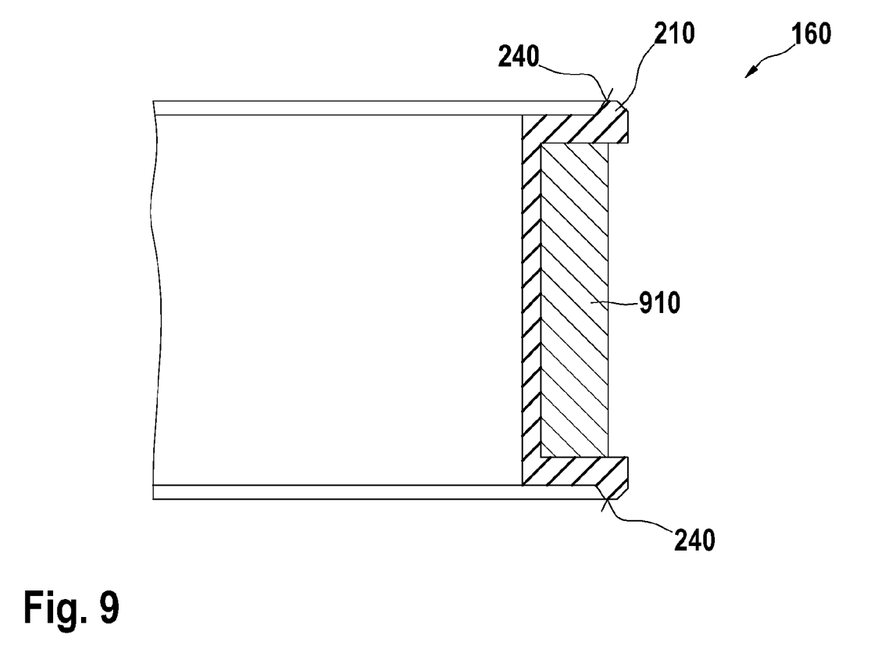
FIG. 9 a sectional view of an eighth embodiment of a seal for the valve from FIG. 1.

FIG. 9 shows a sectional view of an eighth embodiment of the seal 160 for the valve 100 from FIG. 1. The embodiment illustrated corresponds likewise to the embodiment illustrated in FIG. 6, the difference being that, instead of the spring element 610, an all-metal cushion 910 is arranged between the sealing faces 240. The all-metal cushion 910 is elastic and comprises a multiplicity of knitted wire cloths (not illustrated in detail), the portions 620, 630 and 640 from FIG. 6 being replaced by any vertical portions of the all-metal cushion 910.

The invention claimed is:

1. A seal (160) for sealing off two bearing faces (170) lying opposite one another, along a closed contour (180), the seal comprising:
   an elastic sealing element (210) which has two sealing faces (240) lying opposite one another for bearing against the bearing faces (170) in the region of the contour (180), the elastic sealing element (210) having a continuous inner wall with a single inner diameter and a continuous outer wall with a single outer diameter, one of the inner wall or the outer wall having at least two recesses extending radially inwardly inwards or outwards, respectively;
   two spring elements (220, 230) which are assigned in each case to one of the sealing faces (240); and
   a supporting element (250) arranged between the spring elements (220, 230), so as to be integral with the elastic sealing element (210), each of the spring elements (220, 230) comprising two legs (260, 270), of which in each case one leg presses the sealing face (240) assigned to the spring element (220, 230) onto one of the bearing faces (170) and in each case the other leg (260, 270) is supported on the supporting element (250),
   characterized in that the at least two recesses respectively receive the spring elements (220, 230), and
   that at least one of the inner and outer walls extend along an axial extent of the recesses.

2. The seal (160) as claimed in claim 1, characterized in that one of the spring elements (220, 230) comprises a U-shaped or V-shaped profile running along the contour (180).

3. The seal (160) as claimed in claim 1, characterized in that the sealing element (210) covers the spring elements (220, 230) on a low-pressure side for sealing of a pressure drop between an inside and an outside of the contour (180).

4. The seal (160) as claimed in claim 3, with the legs (260, 270) of one of the spring elements (220, 230) pointing in the direction of a high-pressure side.

5. The seal (160) as claimed in claim 1, characterized in that the spring elements (220, 230) and the supporting element (250) are portions of a helical spring (810).

6. The seal (160) as claimed in claim 5, characterized in that the helical spring (810) runs around the contour (180).

7. The seal (160) as claimed in claim 1, characterized in that the spring elements (220, 230) and the supporting element (250) form an elastic all-metal cushion (910) made from knitted wire cloth.

8. The seal (160) as claimed in claim 1, characterized in that the spring elements (220, 230) are substantially parallel to each other.

9. The seal (160) as claimed in claim 1, wherein the legs (260, 270) of one of the spring elements (220, 230) point toward an outside of the seal (160).

10. The seal (160) as claimed in claim 1, wherein the elastic sealing element (210) overlaps three surfaces of the spring elements (220, 230).

11. The seal (160) as claimed in claim 9, characterized in that one of the spring elements (220, 230) comprises a U-shaped or V-shaped profile running along the contour (180).

12. The seal (160) as claimed in claim 11, characterized in that the sealing element (210) covers the spring elements (220, 230) on a low-pressure side for sealing of a pressure drop between an inside and an outside of the contour (180).

13. The seal (160) as claimed in claim 12, with the legs (260, 270) of one of the spring elements (220, 230) pointing in the direction of a high-pressure side.

\* \* \* \* \*

UNITED STATES PATENT AND TRADEMARK OFFICE
CERTIFICATE OF CORRECTION

PATENT NO.         : 8,668,204 B2
APPLICATION NO.    : 13/391321
DATED              : March 11, 2014
INVENTOR(S)        : Reeb et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this
Twenty-ninth Day of September, 2015

Michelle K. Lee
*Director of the United States Patent and Trademark Office*